(12) United States Patent
Cooley

(10) Patent No.: US 9,983,598 B2
(45) Date of Patent: May 29, 2018

(54) FULLY-INTEGRATED FLOW-CONTROL VALVE ASSEMBLY FOR TOP-FILLED FUEL TANKS

(71) Applicant: Robert Charles Cooley, Springville, UT (US)

(72) Inventor: Robert Charles Cooley, Springville, UT (US)

( * ) Notice: Subject to any disclaimer, the term of this patent is extended or adjusted under 35 U.S.C. 154(b) by 0 days. days.

(21) Appl. No.: 14/430,904

(22) PCT Filed: Sep. 24, 2013

(86) PCT No.: PCT/US2013/000223
§ 371 (c)(1),
(2) Date: Mar. 24, 2015

(87) PCT Pub. No.: WO2014/046709
PCT Pub. Date: Mar. 27, 2014

(65) Prior Publication Data
US 2015/0227144 A1   Aug. 13, 2015

Related U.S. Application Data

(60) Provisional application No. 61/705,136, filed on Sep. 24, 2012.

(51) Int. Cl.
*F16K 24/00* (2006.01)
*G05D 9/04* (2006.01)
(Continued)

(52) U.S. Cl.
CPC ............... *G05D 9/04* (2013.01); *B60K 15/04* (2013.01); *F16K 24/044* (2013.01); *F16K 31/34* (2013.01);
(Continued)

(58) Field of Classification Search
CPC ....... F16K 31/122; F16K 31/22; B60K 15/04; B60K 2015/0496; B60K 2015/03576;
(Continued)

(56) References Cited

U.S. PATENT DOCUMENTS 2,767,551 A * 10/1956 Clute .................... F17C 13/021
137/390
3,929,155 A * 12/1975 Garretson ............... F16K 31/18
137/430
(Continued)

FOREIGN PATENT DOCUMENTS

WO    WO 2012124410 A1 *  9/2012  ......... F02M 37/0029

*Primary Examiner* — Craig Schneider
*Assistant Examiner* — Angelisa L Hicks

(57) ABSTRACT

A fully-integrated flow-control valve assembly for top-filled fuel tanks incorporates both a float valve assembly and a shut-off valve assembly in a single unit that screws into a threaded aperture in the top of the fuel tank. Whereas all other systems having similar function rely on an inlet valve and a level control/vent positioned apart from one another and intercoupled with a bleed line that runs either inside or outside the fuel tank, the device of the present invention directly mounts the two devices together and allows a simple installation. There is no need for a line that couples two remotely positioned units of the prior art flow-control assemblies.

4 Claims, 5 Drawing Sheets

(51) Int. Cl.
  *B60K 15/04* (2006.01)
  *F16K 31/34* (2006.01)
  *F16K 24/04* (2006.01)
  *B60K 15/03* (2006.01)
  *B60K 15/035* (2006.01)

(52) U.S. Cl.
  CPC .............. *B60K 2015/03289* (2013.01); *B60K 2015/03368* (2013.01); *B60K 2015/03576* (2013.01); *B60K 2015/0496* (2013.01); *Y10T 137/7371* (2015.04); *Y10T 137/7462* (2015.04)

(58) Field of Classification Search
  CPC .......... B60K 2015/03368; B60K 2015/03289; G05D 9/04
  USPC ................................................ 137/430, 588
  See application file for complete search history.

(56) References Cited

U.S. PATENT DOCUMENTS

| | | | | |
|---|---|---|---|---|
| 4,051,864 A | * | 10/1977 | Iwatsuki | G05D 7/014 137/504 |
| 4,305,422 A | * | 12/1981 | Bannink | F16K 1/305 137/415 |
| 4,444,230 A | * | 4/1984 | Van Mullem | F17C 5/02 137/415 |
| 4,974,645 A | * | 12/1990 | Johnson | B60K 15/035 137/587 |
| 5,232,028 A | * | 8/1993 | Sunderhaus | B67D 7/0288 137/588 |
| 5,235,999 A | * | 8/1993 | Lindquist | B67D 7/365 137/15.01 |
| 5,787,942 A | * | 8/1998 | Preston | F16K 31/30 137/427 |
| 5,832,953 A | * | 11/1998 | Lattner | B67D 7/365 137/315.08 |
| 5,887,609 A | * | 3/1999 | Garretson | F16K 21/165 137/2 |
| 6,311,723 B1 | | 11/2001 | Shipp | |
| 7,793,682 B2 | | 9/2010 | Smit | |
| 9,151,256 B2 | * | 10/2015 | Matsuo | F02M 37/0029 |
| 2011/0114208 A1 | * | 5/2011 | Newman | F17C 13/04 137/588 |

* cited by examiner

FULLY-INTEGRATED FLOW-CONTROL VALVE ASSEMBLY FOR TOP-FILLED FUEL TANKS

BACKGROUND OF THE INVENTION

Field of the Invention

This invention relates, generally, to valve assemblies and, more particularly, to flow control valve assemblies that are used to protect primarily fuel tanks from being overfilled with fuel. However, it is likely that such flow control valve assemblies may be used to protect types of containers, other than fuel tanks, from being overfilled with other kinds of fluids.

Description of the Prior Art

For many years large machinery fitted with fuel tanks have been equipped with fast fill systems to enable rapid filing of large capacity fuel tanks. The existing fast fill fuel systems rely on an air vent that prevents air from escaping the fuel tank when the required level of fuel has been attained. This causes pressure in the fuel tank to increase to a level that automatic shuts-off a fuel supply nozzle.

A major concern of this system is that when the fuel level activates the shut-off for the fuel supply nozzle, the shut-off can be overridden and fuel can continue to be forced into the fuel tank above the normal level. This can cause the fuel tank to rupture from the high pressure attained when filling.

U.S. Pat. No. 6,311,723, (by the applicant), has addressed this problem by devising a flow control valve assembly that prevents the build up of pressure within the fuel tank during and after filing. The flow control valve assembly also prevents the supply fuel nozzle from being overridden thus preventing the possibility of overfilling. U.S. Pat. No. 6,311,723 is hereby incorporated by reference.

The control valve assembly of U.S. Pat. No. 6,311,723 uses float valve to determine when the level of fuel in the fuel tank is at a desired level. When the desired level of fuel has been attained, the float valve is used to block the flow of fuel through a bleed pipe to stop the flow of fuel through a control valve. An open breather is provided within the fuel tank to allow gas to escape from the fuel tank during filling to prevent the fuel tank rupturing.

The flow control valve assembly operates very effectively on machinery that is predominately stationary. However, when the control valve assembly is mounted to vehicles' fuel tanks, such as those located in trucks and excavators, some difficulties may experienced during movement of the vehicle.

One problem that may be experience is that the float valve may become broken. The float valve comprises a float that is mounted on a pivotally movable elongate arm. This arm can break due to the large forces that are exerted on the arm by the surging fuel caused by movement of the vehicle.

In the event that the control valve assembly fails, in this or any other manner, the fuel supply nozzle will continue to fill the tank and pass fuel through the open breather until the nozzle is shut-off manually. This may lead to many hundreds or even thousands of liters of fuel being wasted and the spilt fuel being disposed.

Another problem that occurs is fuel is passed through the open breather during movement of the vehicle. Fuel surges cause fuel to flow through the open breather and escape the fuel tank. Again, this wastes fuel and is environmentally unfriendly. Further, the spilt fuel also creates a fire vehicle hazard.

Another problem associated with prior-art flow control valves is that they are typically used in bottom-filled tanks. This requires that the float assembly be located inside the tank near the top thereof, while the flow control valve is located near the bottom of the tank near where the fuel nozzle couples to the receiver. In order for the float assembly to control the flow control valve, a small-diameter bleed line is used to couple the flow control valve assembly—that is near the bottom of the tank—to the float assembly that is near the top of the tank. The bleed line can be routed either internal or external to the tank, depending on the design of the unit. The use of such a two-piece assembly precludes the use of such a device in smaller tanks.

What is needed is a fully-integrated flow control assembly that mounts at the top of the fuel tank. In such a fully-integrated unit, the float assembly and the flow control valve assembly are both installed within the tank near the top thereof. Only an inlet/vent head protrudes from the top of the tank. Installing the fully-integrated assembly is much simpler than installing the separate float and control valve assemblies, as there is no need to make a connection between the two devices.

SUMMARY OF THE INVENTION

The present invention provides a fully-integrated flow-control valve assembly for top-filled tanks. Rather than installing a float and bleed control valve assembly at the top of the tank, installing a main fluid flow control valve assembly at the bottom of the tank and connecting the two assemblies with a fluid bleed line that is typically routed within the tank, the fully-integrated flow-control valve assembly is installed vertically, as a single unit, within the tank near the top thereof. The float and bleed control valve assembly is combined with a main fluid flow control valve assembly as a single unit, and only an inlet/vent head protrudes from the top of the tank.

The fully-integrated flow control assembly has been designed primarily for use in fuel tanks used for heavy equipment having diesel internal combustion engines. Thus, the invention will be described in this context of such use. Nevertheless, it is likely that such a flow control valve assembly may find use for other applications where there is a need to protect types of containers, other than fuel tanks, from being overfilled with other kinds of fluids.

The fully-integrated flow control assembly includes an inlet/vent head, an inlet/vent body secured to the inlet/vent head with a plurality of screws, an inlet drop tube secured to the inlet/vent body, a bleed control body secured to the inlet drop tube, an inlet body secured to the bleed body, an inlet piston housed within the inlet body, a sealing sleeve fitted between an inlet piston and the inlet body, a control spring, an inlet cap secured to the inlet body, a bleed housing fitted between the inlet body and the bleed body, a bleed stem fitted through the bleed control body, a seal on the bleed stem, a float attachable to the bleed stem, at least one float guide fitted through a float, an upper housing segment secured attachable to the inlet/vent body, at least one lower housing segment attachable to upper housing segment, and a lower housing segment cap attachable to the lower housing segment.

Fluid enters the fully-integrated flow control valve assembly either through a hose that couples a remote fuel receiver to the fuel inlet or through a receiver that is directly connected to the fuel inlet. The fuel passes through an inlet passage, enters the inlet drop tube, passes through a central duct in the bleed control body and exerts a force on the face of the inlet piston, thereby overcoming the force of the control spring and pushing the inlet piston down, thereby allowing fuel (fluid) to pass through an escape passage and into the lower housing segment, and subsequently into the bottom of the tank.

A small amount of the fluid that is exerting force on the face of inlet piston flows into a bleed circuit through a central aperture in the inlet piston. This bleed fluid flow into a spring chamber within the inlet housing that is created by the gap between the inlet piston and the inlet cap. The bleed fluid then flows from the spring chamber through slots in the inlet cap into a first annular bleed channel, and then into a first vertical bleed passage in the side wall of the inlet body. The bleed fluid then flows from the first vertical bleed passage into a second annular bleed channel and into a second vertical bleed passage in the side wall of the bleed housing. The bleed fluid then flows from the second vertical bleed passage to the third annular bleed channel created between the bleed body and the bleed housing. The bleed fluid enters a third vertical bleed passage between the bleed body and the bleed housing, and exits through a passage created between the bleed body and the bleed stem, and spills into a fourth annular bleed channel. From the fourth annular bleed channel, the bleed fluid finds its way into the tank through at least one of several vent slots in the side wall of the upper housing segment. As fluid fills the tank, exiting the lower housing segment through the lower housing segment cap, air from the tank is allowed to escape through a vent passage, a vent channel and the vent port which is either directly or remotely coupled to a filtration device that prevents the entry of dust and grit from outside the tank. As fuel is drained from the tank air is allowed to reenter through the same port and passages.

Once a the fluid in a filling tank reaches a predetermined level, the float is raised, guided by at least one float guide and the bleed stem. The float lifts the bleed stem bringing seal in contact with a sealing face in the bleed body, thereby sealing all bleed channels and passages. This causes an equalization of pressure on both sides of the inlet valve, which then allows the control spring to push the inlet valve closed, thereby stopping the flow of fuel into the tank. The increase in pressure from the stoppage of fuel flow is sensed by the nozzle at the filling point, which immediately cuts off the flow of fluid passing through the nozzle.

PREFERRED EMBODIMENT OF THE INVENTION

Figure 1:
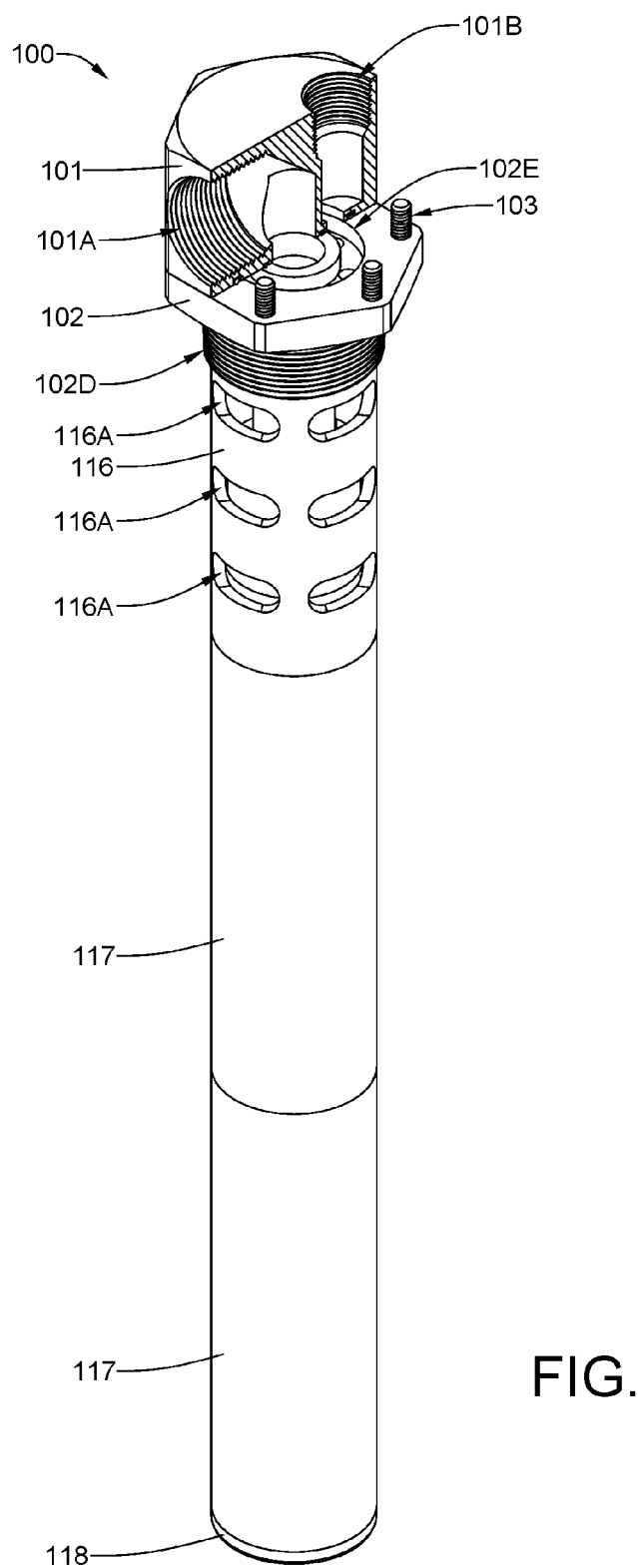
FIG. 1 is a partial-cut-away isometric view of the fully-integrated flow-control valve assembly.
Figure 2:
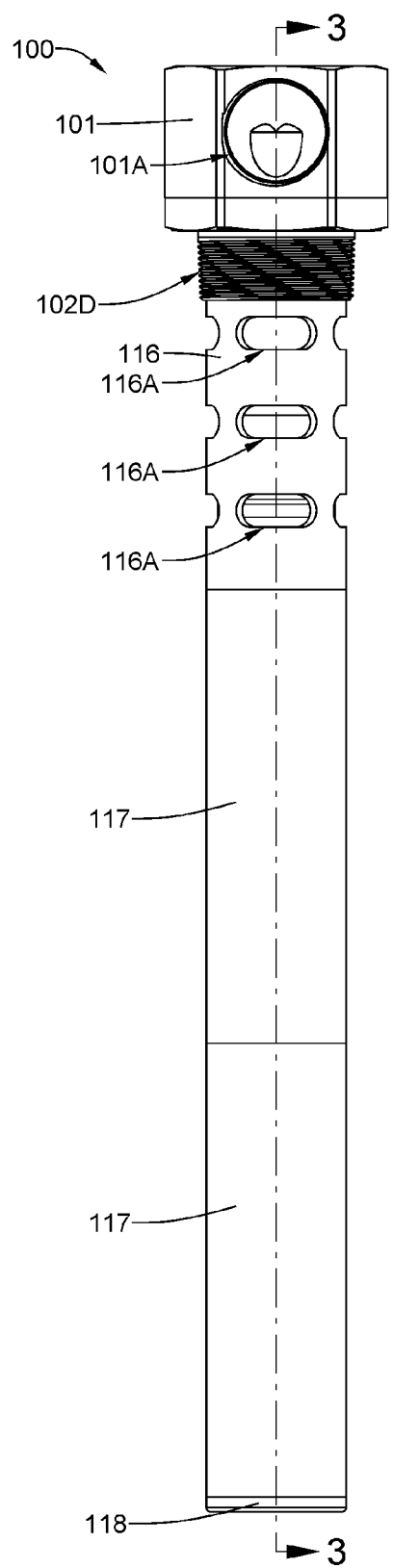
FIG. 2 is an elevational view of the fully-integrated flow-control valve assembly.
Figure 3:
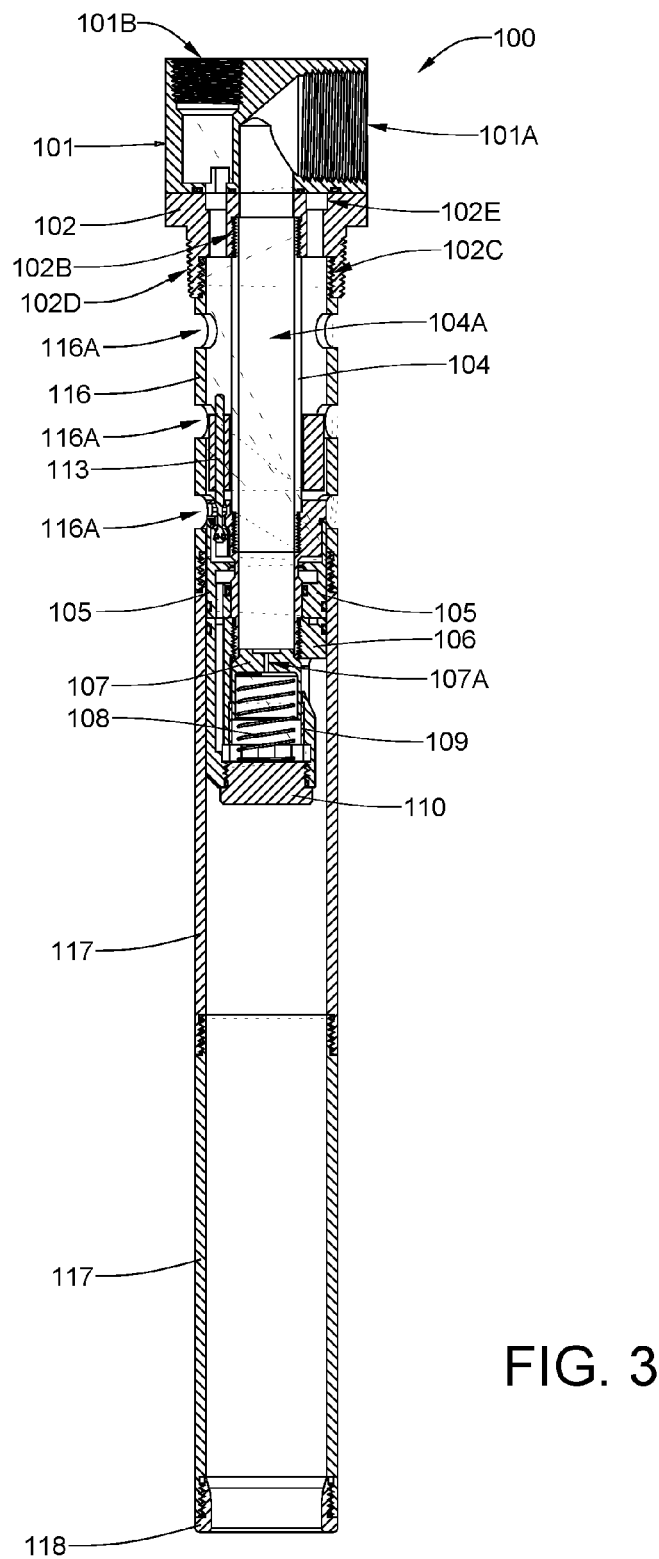
FIG. 3 is an elevational cross-sectional view of the fully-integrated flow-control valve assembly, minus the spring, taken through section line 3-3 of FIG. 2.
Figure 4:
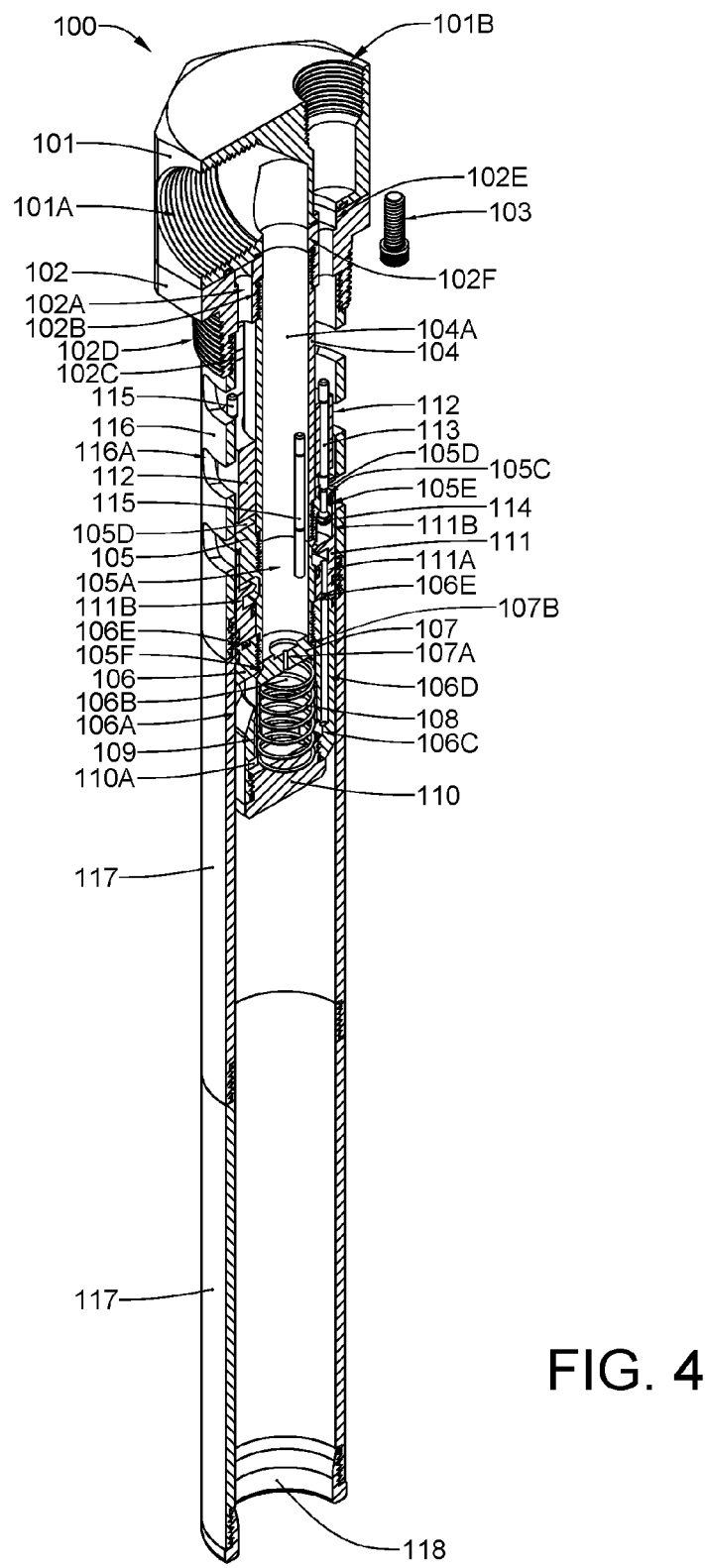
FIG. 4 is an cross-sectional isometric view of the fully-integrated flow-control valve assembly, showing the other half of the assembly that was cut off in the cross-sectional view of FIG. 3.
Figure 5:
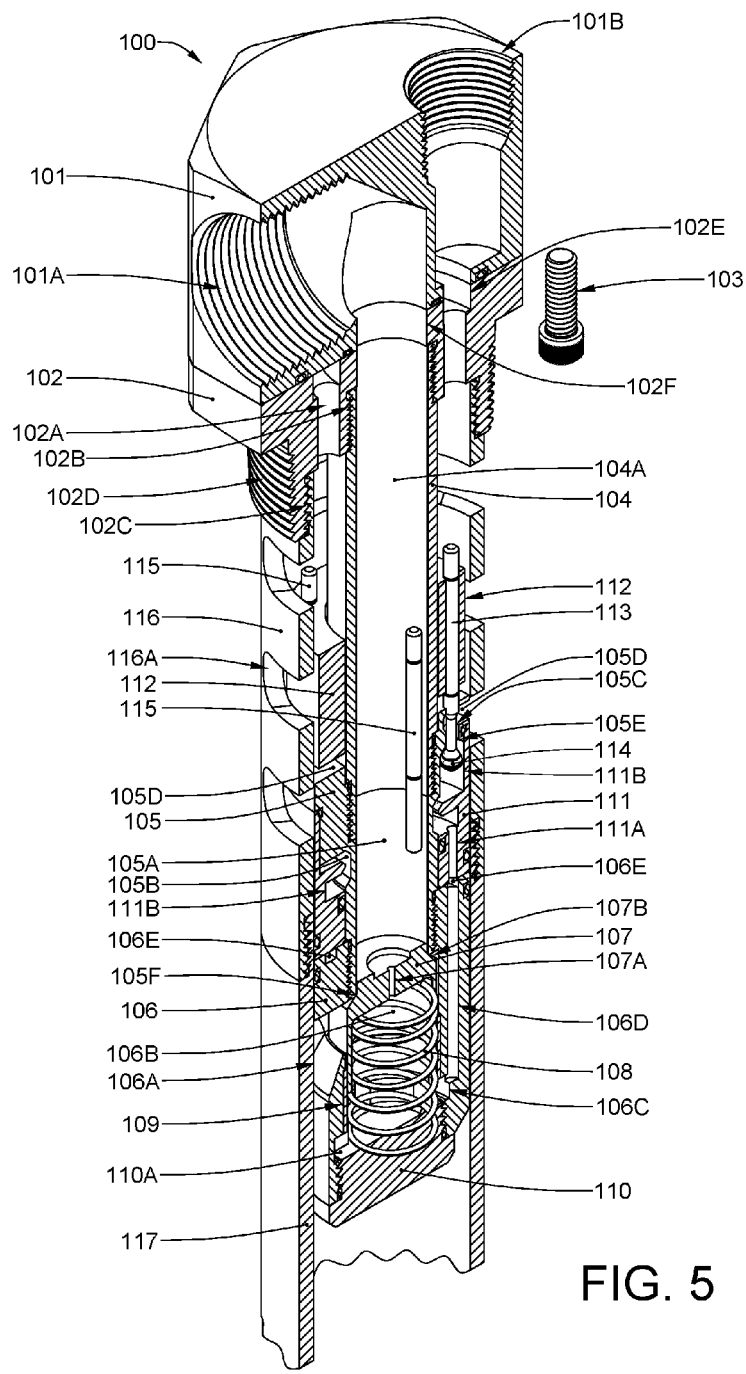
FIG. 5 is an enlarged view of the top portion of FIG. 4.

The new fully-integrated flow control assembly 100 will now be described in detail, with reference to the attached drawing figures.

The device is comprised of an inlet/vent head 101, an inlet/vent body 102 attachable to inlet/vent head 101 by a series of six screws 103, an inlet drop tube 104 attachable to inlet/vent body 102, a bleed body 105 attachable to inlet drop tube 104, an inlet body 106 attachable to bleed body 105, an inlet piston 107 housed within inlet body 106, a sealing sleeve 109 fitted between inlet piston 107 and inlet body 106, a control spring 108, an inlet cap 110 attachable to inlet body 106, a bleed housing 111 fitted between inlet body 106 and bleed body 105, a bleed stem 113 fitted through bleed body 105, a seal 114 on bleed stem 113, a float 113 attachable to bleed stem 113, at least one float guide 115 fitted through float 113, an upper housing segment 116 attachable to inlet/vent body 102, at least one lower housing segment 117 attachable to upper housing segment 116, and a lower housing segment cap 118 attachable to lower housing segment 117.

The device is attachable to the top of a fuel tank, mounted vertically. The inlet/vent body 102 has a central internal thread 102B that enables the inlet drop tube 104 to be threadably connected thereto. In addition, the inlet/vent body 102 has an outer internal thread 102C that enables the upper housing segment 116 to be threadably connected thereto. Furthermore, the inlet/vent body 102 has an external thread 102D that enables the fully-integrated flow control assembly 100 to be screwed into a female threaded opening in the top of a fuel tank (not shown). Fluid enters either through a hose directly connected to inlet 101A and remotely connected to a receiver or through a receiver directly connected to inlet 101A, flows through central aperture 102F in the inlet/vent body 102, through a central conduit 104A in inlet drop tube 104, through a central duct 105A in bleed control body 105, and exerts a force on the face of inlet piston 107, thereby overcoming the upward force exerted by control spring 108, which pushes the inlet piston 107 toward a closed position, thereby allowing the fluid to flow around the inlet piston 107, through passage 106A, into the lower housing segment 117, through the lower housing segment cap 118, and into the tank.

A small amount of the fluid exerting force on the face of inlet piston 107 flows into a bleed circuit through the central aperture 107A in the inlet piston 107. This bleed fluid flows into the spring chamber 106B of the inlet housing 106 created between the inlet piston 107 and the inlet cap 110. The bleed fluid then flows from the spring chamber 106B through slots 110A in the inlet cap 110, into a first annular bleed channel 106C, and into a first vertical bleed passage 106D in the side wall of the inlet body 106. The fluid then flows from the first vertical bleed passage 106D into a second annular bleed channel 106E and into a second vertical bleed passage 111A in the side wall of the bleed housing 111. The fluid then flows from the second vertical bleed passage 111A to a third annular bleed channel 105B of U-shaped cross section that is created between the bleed body 105 and the bleed housing 111. The fluid enters a third vertical bleed passage 111B between the bleed body 105 and the bleed housing 111, and exits through the passage 105C created between the bleed body 105 and the bleed stem 113 spilling into a fourth annular bleed channel 105D. From the fourth annular bleed channel 105D, the fluid finds its way into the tank through at least one of the vent slots 116A in the side wall of the upper housing segment 116.

As fluid fills the tank, exiting the lower housing segment 117 through the lower housing segment cap 118, air is allowed to vent through at least one vent passage 102A, through vent channel 102E, and, finally, through the vent port 101B which is either directly or remotely connectable to a filtration device. As fuel is drained from the tank air is allowed to enter through the same port and passages. Once a the fluid in a filling tank reaches a predetermined level, the float 112, which surrounds the inlet drop tube 104, is raised, guided by at least one float guide 115 and the bleed stem 113. The float lifts the bleed stem bringing seal 114 in contact with a bleed valve seat 105E in the bleed body 105, thereby closing the bleed fluid path to the tank. This causes an equalization of pressure on both sides of the inlet valve 107, which enables the control spring 108 to push the inlet piston 107 closed so that a sealing shoulder 107B on the inlet piston 107 contacts an inlet valve seat 105F at the bottom end of the bleed control body 105, thereby stopping flow into the tank.

What makes this fully-integrated flow control assembly 100 unique is that all other similar systems rely on an inlet valve and a level control/vent remotely positioned with respect to one another, and being connectable to each other with a fluid bleed line. This device directly mounts the two devices together and allows a simple installation.

Although only a single embodiment of the invention is shown and described herein, it will be obvious to those having ordinary skill in the art that changes and modifications may be made thereto without departing from the scope and the spirit of the invention as hereinafter claimed.

What is claimed is:

1. A fully-integrated flow-control valve assembly for top-fill tanks, said assembly comprising:
    an inlet/vent head;
    an inlet/vent body secured to the inlet/vent head;
    an inlet drop tube having an upper end secured to the inlet/vent body;
    a bleed body providing a fluid bleed path into the tank, said bleed body having an upper end secured to a lower end of the inlet drop tube, and said bleed body incorporating a bleed stem which, when lifted, seals the fluid bleed path;
    an inlet body secured to a lower end of the bleed body;
    an inlet piston housed within the inlet body;
    a sealing sleeve fitted between the inlet piston and the inlet body;
    an inlet cap;
    a float which surrounds the inlet drop tube, said float coupled to said bleed stem so that it lifts the bleed stem when the tank is full; and
    a control spring positioned between the inlet cap and the inlet piston;
    wherein the force of the control spring is sufficient to move the inlet piston to shut off fluid flow when the bleed stem is lifted by the float, thereby sealing the bleed path so that pressure above and below the inlet piston is equalized.

2. A flow-control valve assembly for a top-fill tank comprising:
    an inlet/vent head through which fluid can be fed into the tank and through which air in the tank escapes as the tank is filled;
    an inlet body coupled to the inlet/vent head, said inlet body housing an inlet piston movable between an open first position that allows fluid to enter the tank, and a closed second position that cuts off entry of fluid into the tank, said inlet piston having a bleed aperture therein that leads to a controllable bleed path into the tank, and said inlet piston being biased, by a coil spring positioned on the bleed path side of the inlet piston, toward a closed position, and having a bleed aperture therein;
    a bleed body coupled to the inlet body, said bleed body providing the controllable bleed path into the tank that is controlled by a bleed stem movable between open and closed positions, said bleed path, when open during tank filling operations, creating a condition of unequal fluid pressure on opposite sides of the inlet piston, with fluid pressure on a top surface of the inlet piston being greater than fluid pressure on the underside thereof, so that a biasing force of the coil spring is insufficient to move the inlet piston to the closed second position; and
    a float that is raised by fluid in the tank as the fluid approaches a full level, said float being mechanically coupled to said bleed stem so that when the tank is full, the float causes the bleed stem to move to a closed position, thereby closing the bleed path and causing fluid pressure on the bleed path side of the inlet piston to increase such that the coil spring then has sufficient force to move the inlet piston to the closed second position;
    wherein the inlet/vent head, the inlet body, the bleed body, and the float are fully integrated into a single unit that can be screwed into a female threaded opening in a top of the fuel tank.

3. The flow-control valve assembly of claim 2, which further comprises:
    an inlet/vent body secured to the inlet/vent head;
    an inlet drop tube having an upper end secured to the inlet/vent body and a lower end secured to the bleed body;
    a sealing sleeve fitted between the inlet piston and the inlet body; and
    an inlet cap; and
    wherein said inlet body is secured to a lower end of the bleed body, and the float surrounds the inlet drop tube.

4. A flow-control valve assembly for a top-fill tank comprising:
    an inlet/vent head through which fluid can be fed into the tank and through which air in the tank escapes as the tank is filled;
    a float that is raised by fluid in the tank as the tank reaches its maximum capacity;
    an inlet body having an inlet piston movable between an open first position that allows fluid to enter the tank, and a closed second position that cuts off entry of fluid into the tank, said inlet piston being having a bleed aperture therein that leads to a controllable bleed path into the tank, and said inlet piston being biased toward the closed position by a coil spring under compression, said coil spring having insufficient force to move said inlet piston to the closed second position, as long as incoming fuel is allowed to pass through a bleed aperture in the piston and to enter the tank through the bleed path; and
    a bleed body which controls the entrance, into the tank, of fluid which has passed through the bleed aperture, in response to float position, said bleed body preventing fluid from the bleed aperture from entering the tank when the tank has reached its maximum fuel capacity which, in turn, causes fluid pressure on both sides of the inlet piston to equalize so that the coil spring then provides sufficient biasing force to move the inlet piston to the closed second position;
    an inlet/vent body secured to the inlet/vent head;
    an inlet drop tube having an upper end secured to the inlet/vent body and a lower end secured to the bleed body;

a sealing sleeve fitted between the inlet piston and the inlet body; and an inlet cap;

wherein the inlet body is secured to a lower end of the bleed body, the float surrounds the inlet drop tube, and the inlet/vent head, the inlet body, the bleed body, and the fuel level float are fully integrated into a single unit that can be screwed into a female threaded opening in a top of the fuel tank.

\* \* \* \* \*